AUTOMATIC RECORD PLAYER

Filed Oct. 20, 1964 4 Sheets-Sheet 1

INVENTORS
Fumio Fukuda
Tadashi Watanabe
Uneho Niimi
BY Stevens, Davis, Miller & Mosher
ATTORNEYS

AUTOMATIC RECORD PLAYER

Filed Oct. 20, 1964 4 Sheets-Sheet 2

INVENTORS
Fumio Fukuda
Tadashi Watanabe
Uneho Niimi
BY Stevens, Davis, Miller & Mosher
ATTORNEYS INVENTORS
Fumio Fukuda
Tadashi Watanabe
Uneho Niimi
BY Stevens, Davis, Miller & Mosher
ATTORNEYS

AUTOMATIC RECORD PLAYER

Filed Oct. 20, 1964 4 Sheets-Sheet 4

INVENTORS
Fumio Fukuda
Tadashi Watanabe
Uneho Niimi
BY Stevens, Davis, Miller & Mosher
ATTORNEYS United States Patent Office 3,342,499
Patented Sept. 19, 1967

3,342,499
AUTOMATIC RECORD PLAYER

Fumio Fukuda, Daito-shi, Tadashi Watanabe, Fuse-shi, and Uneho Niimi, Moriguchi-shi, Japan, assignors to Matsushita Electric Industrial Co., Ltd., Kadoma-shi, Japan Filed Oct. 20, 1964, Ser. No. 405,091
Claims priority, application Japan, Dec. 2, 1963, 38/65,730; Dec. 10, 1963, 38/66,943; Dec. 11, 1963, 38/69,313, 38/95,812; Dec. 12, 1963, 38/93,846; Dec. 26, 1963, 38/98,722; Jan. 13, 1964, 39/2,781
6 Claims. (Cl. 274—9)

ABSTRACT OF THE DISCLOSURE

An automatic record player having a start lever on the center shaft of the turntable so that when a record is placed over the center shaft and down onto the turntable, the start lever is displaced to automatically drive the turntable and to swing the tonearm onto the record. Means are provided to detect the size of the record and control the swing of the tonearm accordingly; along with means to automatically return the tonearm to its initial rest position when the record playing is finished, and effect a repetitive swing of the tonearm to permit automatic playing.

This invention relates to record players and particularly to their automatization.

Various investigations have previously been made for automatization of record players. Many of previous forms of record player designed, however, have necessitated manual switching or like operation for their start after the placing of the record disc on the turntable of the player. No playing system has been known in the art which can be started without use of any manual operating member.

A record-playing system such as so-called "music box" has been known in which record discs are automatically selected to be placed on the turntable by an arm member provided for the purpose and subsequently the turntable and tonearm means are started automatically. However, such system has been unsuitable for a simple and handy record player because of its complicacy including a mechanism for taking out a record disc selected and other special means for the automatic starting.

The inventors have conducted investigations to overcome the above situation and have succeeded in obtaining a simple form of record player the main mechanism of which is operable in response to and immediately upon the placing of a record disc on the turntable of the player.

According to one characteristic feature of the present invention, the record player comprises a mechanism for detecting the outside diameter of the record disc and causing a succession of movement for automatically carrying the pickup into a predetermined position on the disc and, when the disc has been played completely, back into the normal position on the pickup rest, and this mechanism is started by displacement of a start lever disposed in the region of the center shaft of the turntable when the record disc is placed thereon.

Another feature of the present invention is that the movement of the start lever and the main mechanism responding thereto is caused only when a record disc is fitted on the center shaft of the turntable and upon withdrawal of the disc from the center shaft the main mechanism is rendered inoperative by a bent formation on the bottom end of the start lever.

According to a further feature of the present invention, the record player comprises a main mechanism operable in association with the displacement of the start lever described above and also means for restraining the swing motion of the actuating lever to make the main or automatic record-playing mechanism ineffective so that the record may be freely played under manual control.

Another feature of the present invention is that the main or mechanism automatic record-playing mechanism associated with the start lever and including a tonearm reciprocating device is provided with a mechanism for controlling the device to repeat the reciprocatory swing motion of the tonearm for continuous record playing.

A still further object of the invention lies in that an adapter for use in playing a record disc having a center bore of larger diameter can be freely fitted on the main center shaft of the turntable and an auxiliary start lever arranged on the adapter is associated with the start lever for the main mechanism arranged on the center shaft of the turntable for cooperation with the latter lever.

According to yet another feature of the present invention, the adapter for use in playing a record disc having a center bore of larger diameter has an automatic drop means and an operating member which can be actuated in an axial direction under pressure and which is arranged for cooperative association with the start lever for the main mechanism arranged on the main center shaft of the turntable.

The nontouch record player embodying these and other features of the present invention is an automatic record playing machine which does not necessitate any intermediate manual operation and is designed to automatically select the kind of a record disc to start playing the latter simply by placing the disc on the turntable and which is automatically restored to its normal state ready to start another playing when the disc has been played completely. Also, the inventive record player can be operable for either automatic or manual record playing as required and is usable with record discs having a center bore of larger diameter with the same performance as those having a center bore of smaller diameter. In addition, with the record player, record discs having a center bore of larger diameter can be played automatically in a successive fashion by causing the discs to drop onto the turntable one after another each time the disc has been played completely.

The present invention will next be described in further detail with reference to the accompanying drawings, which illustrate one embodiment of the invention and in which.

The general construction of the nontouch record player according to the present invention will first be described with reference to FIGS. 1, 2 and 3.

Figure 1:
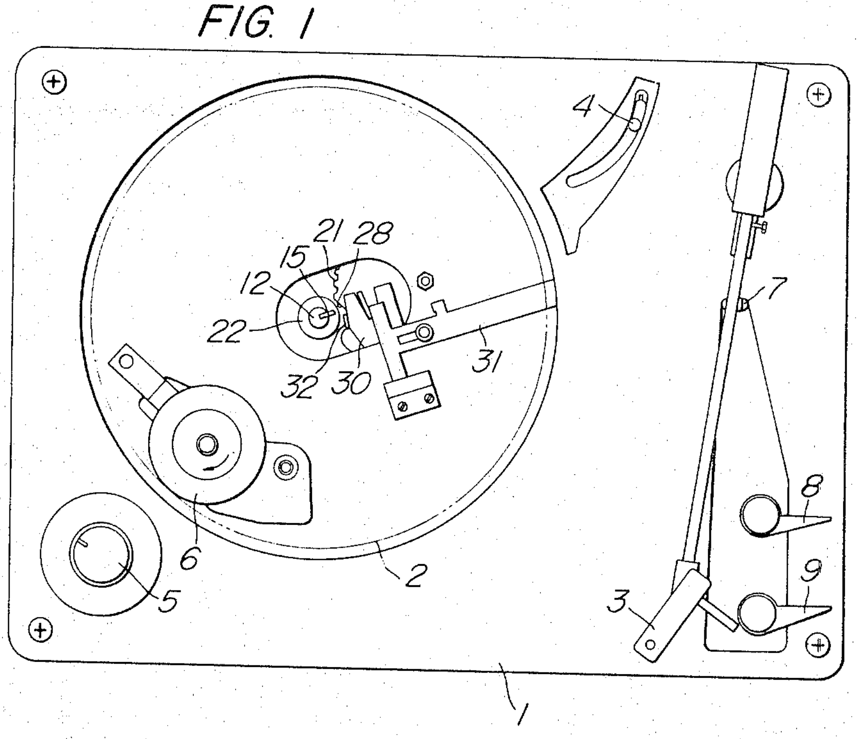
FIG. 1 is a top plan view of the record player with its turntable removed.

As shown in FIG. 1, the player includes a panel 1 on which are arranged a turntable 2, a tonearm 3 having a pickup at the end thereof, a pin 4 for detecting the outer diameter of a record disc, a knob 5 for speed control, an idler 6 for driving the turntable and associated with the knob 5, a tonearm rest 7, a changeover knob 8 for switching between manual and automatic playing operation and a manual restoring knob 9.

Figure 2:
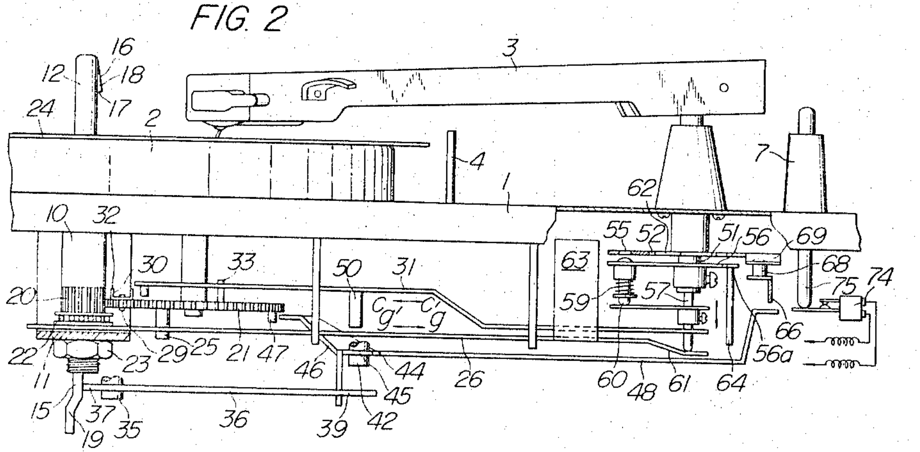
FIG. 2 is a vertical sectional view of the turntable and associated parts of the record player.
Figure 3:
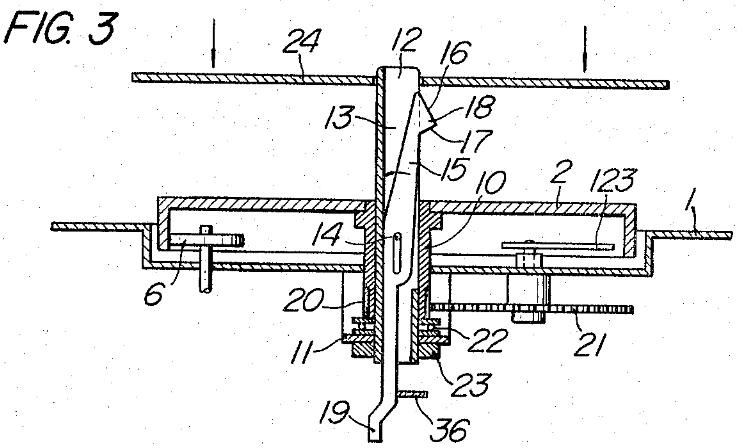
FIG. 3 is a side elevational view of the main mechanism.

As shown in FIGS. 2 and 3, the turntable 2 is fixedly mounted on a hollow shaft 10 and a center shaft 12 for the turntable mounted on a fixed bracket 11 is inserted through the hollow shaft 10 so that the turntable is supported for free rotation about the axis of the center shaft 12. An axial slit 13 is formed in the center shaft 12 and in this slit is arranged a start lever 15 for pivotal movement about a pivotal pin 14.

The start lever 15 carries on its top end an angular actuating pawl 18 which includes tapered edges 16 and 17 and normally projects radially outward of the center shaft 12 with a bent formation 19 carried on the bottom end of the start lever 15 and extending in a direction opposite to that in which said actuating pawl 18 projects.

The turntable shaft 10 carries at its bottom a gear 20 formed integral with the shaft for meshing engagement with a main gear wheel 21 as a main drive source for the main mechanism.

In these figures, reference numeral 22 indicates a thrust ball bearing for supporting the turntable shaft 10; 23 indicates a nut for securing the center shaft 12 for the turntable to the fixed bracket 11; and 24 indicates a record disc being placed on the turntable 2.

Eccentrically provided on the main gear wheel 21 is a projecting pin 25 which is fitted in an elongated slot 27 formed in a slider base 26 transversely thereof so that as the main gear wheel 21 rotates the slider base 26 is driven by the pin 25 to move axially of the base itself. The outer periphery of the main gear wheel 21 includes an arcuate recess 28 which lacks tooth formation. It will be apparent that, when the arcuate recess 28 is brought into an angular position opposite to the geared portion 20 of the turntable shaft 10, its meshing engagement with the main gear wheel 21 is released to interrupt transmission of rotative movement between the gear members 20 and 21.

Mounted on the main gear wheel 21 adjacent to the recess 28 formed therein is a start pawl 30 which is free to rotate in a horizontal plane about a pivot 29. A starting bar 31 is arranged along the slider base 26 for sliding movement in a longitudinal direction and upon movement of the starting bar 31 radially inward of the turntable the start pawl 30 is pushed to rotate so that a lug 32 formed on the start pawl 30 is moved into a position projecting outwardly into the recess 28 in the main gear wheel 21.

The returning movement of the starting bar 31 is effected when the main gear wheel 21 is rotated further to carry a pin 33, secured to and projecting upwardly from the top face thereof, into pushing engagement with a lug 34 formed sidewise of the starting bar 31.

A bellcrank lever 36 is rotatably mounted on the panel 1 by means of a pivot pin 35 and one of the lever arms 37 is in engagement with the bottom of the start lever 15, arranged on a portion of the main center shaft 12 for the turntable as described hereinbefore, under the bias of a tension spring 38. Movement of the start lever 15 apparently causes rotation of the L-shaped or bellcrank lever 36 against the bias of spring 38. The other arm 39 of the bellcrank lever 36 carries a hook formation 41 having a tapered edge 40. The hook formation 41 is arranged for engagement with the first arm 45 of a three-armed lever 44, which is pivotally mounted on a pin 42 and normally biased in one direction by a spring 43.

The second arm 46 of the three-armed lever 44 extends adjacent to the face of the main gear wheel 21 and is actuatable by a pin 47 carried on the face of the gear wheel 21 to effect restoration of the main mechanism to its normal state. The third arm 48 of the three-armed lever 44 is associated with the tonearm operation control, which will be described hereinafter.

Mounted on the three-armed lever 44 is a resilient piece 49 for pressure engagement with a pin 50 secured to the starting bar 31 to shift the latter toward the start pawl 30 mounted on the main gear wheel 21.

Description will next be made on the tonearm arrangement of the record player, which includes a tonearm 3 rotatably mounted on a shaft 51, on which a selector plate 52 is fitted for rotation in a horizontal plane with a spring 53 arranged to bias the selector plate 52 in a clockwise direction. The selector plate 52 is formed with a plurality of shoulders 54*a*, 54*b* and 54*c* along the outer periphery of the plate for determining the swung position of the tonearm 3 according to the diameter of record discs to be played and also with an aperture 55 for clutching engagement. Arranged for cooperation with the selector plate 52 is a clutch plate 56 connected with the pickup drive shaft 51. Arranged below the clutch plate 56 in opposing relation thereto is a clutch lifter plate 58 which is connected to the bottom end of a tonearm lifter rod 57 fitted in the tonearm drive shaft 51 for free vertical movement therein. A clutch pin 60 is supported by the clutch lifter plate 58 and clutch plate 56 and biased downwardly by a spring 59. Upon upward movement of the clutch lifter plate 58, the clutch pin 60 is engageable with the clutching aperture 55 formed in the selector plate 52. This engagement obviously connects together the clutch lifter plate 58, clutch plate 56, selector plate 52 and tonearm 3 for their rotation as an integral unit.

The lifting movement of the tonearm lifter plate 58 and hence of the tonearm 3 associated therewith is effected by the movement of the slider base 26. To this end, the slider base 26 carries at its rear end a cam formation 61 which is in continuous engagement with the lower portion of the clutch lifter plate 58 and is movable to vertically shift the latter 58.

Formed on a portion of the slider base 26 is an integral pusher plate 63 (FIGS. 2 and 4) which is operable, when the tonearm is swung back to its normal position, to engage a lug 62 formed on the selector plate 52 thereby to rotate the latter and clutch plate 56 in a counterclockwise direction. The clutch plate 56 has formed thereon a lug 56*a* which carries a projecting pin 64 for returning operation of the tonearm 3. When the needle in the tonearm 3 reaches the final turn of the groove in the record disc being played, the pin 64 acts to push the starting bar 31 at its rear end so that the bar is displaced toward the start pawl 32 on the main gear wheel 21. Accordingly, the main gear wheel 21 is driven to operate the slider base 26 in a manner so as to swing back the tonearm 3, as will become apparent from the description made hereinafter on the operation of the record player.

Figure 5:
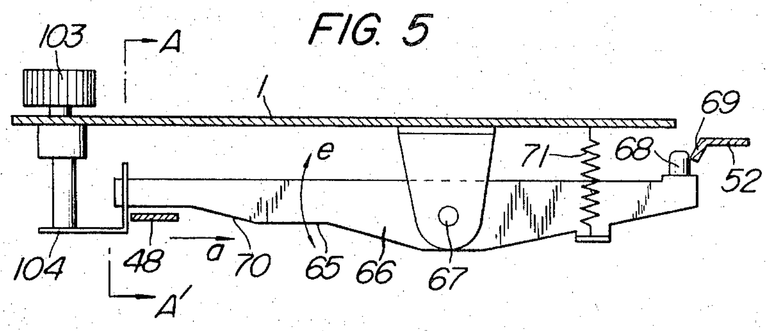
FIG. 5 is a side elevational view of the selector plate arresting lever and associated parts.

In a position adjacent to the rotation control for the tonearm 3, a cam lever 66 is rotatably mounted on a portion of the panel 1 by means of a pivot 67 and has a cam formation 65 on one arm of the lever (FIG. 5). The other arm of the cam lever 66 carries a pin 68 for engagement with a lug 69 formed on the selector plate 52 so that the rotation of the latter is restrained when the tonearm 3 is positioned on the tonearm rest. Also, an inclined shoulder 70 is formed on the bottom edge of said one arm of the cam lever 66 and adjacent to the arm end so that the lever 66 is rotated about its pivotal axis by the movement of the third arm 48 of three-armed lever 44 to operate the tonearm 3. A spring 71 is provided to normally urge the cam lever 66 in a counterclockwise direction.

Figures 6, 7:
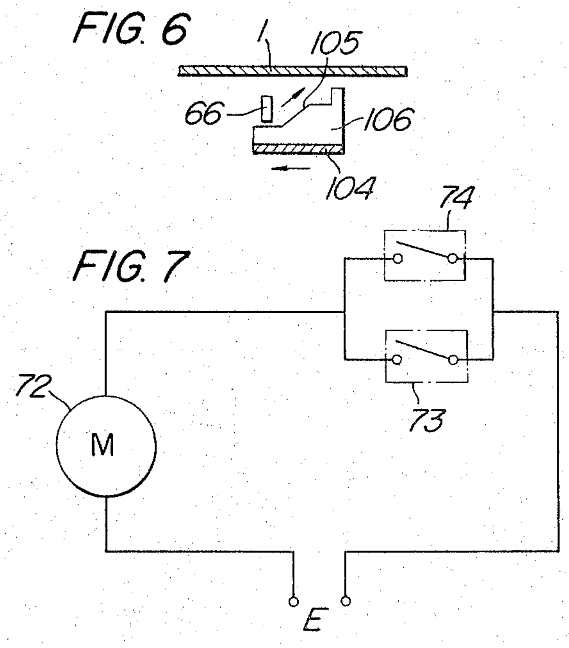
FIG. 6 is a cross-sectional view taken along the line A—A' in FIG. 5.
FIG. 7 is a connection diagram of the motor circuit.

An on-off switch 73 is inserted in the circuit for controlling a drive motor 72 and is controlled by rotation of the selector plate 52. As shown in FIG. 7, another switch 74 is inserted in the motor circuit in parallel to the first switch 73. The second switch 74 is disposed beneath the tonearm rest 7 and is controllable by a switch actuator rod 75 (FIG. 2), which is vertically slidable in the tonearm rest 7.

Also associated with the selector plate 52 is a slider 78 which is guided by pins 76 for longitudinal sliding movement and carries a projection 77, which in turn is engageable with positioning shoulders 54*a*, 54*b* and 54*c* formed on the selector plate 52 to select the position into which the needle of the tonearm 3 drops in accordance to the diameter of the record disc 24. A tension spring 79 is arranged to bias the slider 78 in a longitudinal direction.

The mechanism for detecting the outside diameter of a record disc and operable in response to the detection is constructed as follows. Rotatably mounted on a pivot pin 80 in a position close to the outer periphery of the main gear wheel 21 is a first lever 81 to which a second lever 82 is pivoted by means of a pin 83. A stop 84 is formed on the first lever 81 to limit rotation of the second lever 82 in one direction with a tension spring 85 arranged to bias the second lever 82 in said direction relative to the first lever 81. A fixed stop 86 is arranged to limit rotation of the first lever 81 in one direction.

The first lever 81 has a laterally extending arm 87, with which is engageable a pin 88 carried on the slider base 26 to swing the lever 81.

A third lever 90 is rotatably arranged on a pivot 89 in a position adjacent to the second lever 82 and carries on one end a pin 91 in abutting relation to the adjacent edge of the second lever 82. The third lever 90 has an extension 92 which carries a pin 4 for detection of the disc diameter. The pin 4 extends through an arcuate slot 93 formed in the panel 1 and is thus guided for sliding movement along the panel surface to engage the peripheral edge of the record disc 24 for detection of the disc size.

The third lever 90 also carries a pin 94 at the other end, which fits in a guide slot 97 formed in a fourth lever 96 pivoted at 95 to the panel and thus serves to transmit the movement of the third lever 90 to the fourth one 96. The fourth lever 96 is arranged to engage at one arm end a pin 99 fixed to the slider 78 at the adjacent end thereof for the purpose of actuating the slider 78.

Next, the mechanism for releasing the automatic playing is constructed as follows. An automatic-playing release lever 101 is pivotally mounted on a pin 100 in a position close to the three-armed lever 44. When the release lever 101 is rotated in a counterclockwise direction, a pin 102 carried on one arm end of the lever is brought into engagement with the tapered edge 40 formed on one arm 39 of the bellcrank lever 36 so as to rotate the latter in a clockwise direction as indicated by the arrow *a* in FIG. 4 while holding the three-armed lever 44 in its previous position thereby to hold the main mechanism in its inoperative state. Secured to the cam lever 66 at its left-hand end is a cam arm 104 which is rotated by means of a knob 103 to rock the cam lever 66 for repeated record playing operation. The cam arm 104 is formed with an integral upstanding piece 106 having an inclined top edge 105, which is in sliding engagement with the bottom edge of the cam lever 66 at its adjacent end.

The adapter means according to the present invention will next be described with reference to FIG. 8. The device includes an adapter piece 107 which can be releasably fitted over the center shaft 12 for the turntable. An actuating lever 109 is rotatably mounted in the adapter 107 by means of a pin 108 in a manner so that a portion of the actuating lever 109 is engageable with the actuating pawl 18 formed on the start lever 15, which is mounted on the center shaft 12. An actuator pawl 110 is formed at the other end of the actuating lever 109 so as to extend beyond the periphery of the adapter 107. It will be noted that, when a record disc 24 having a central aperture of larger diameter is fitted over the adapter 107, the actuator pawl 110 is pushed into the adapter and cooperates with the start lever 15 and actuator pawl 18 to start the main mechanism.

Figure 9:
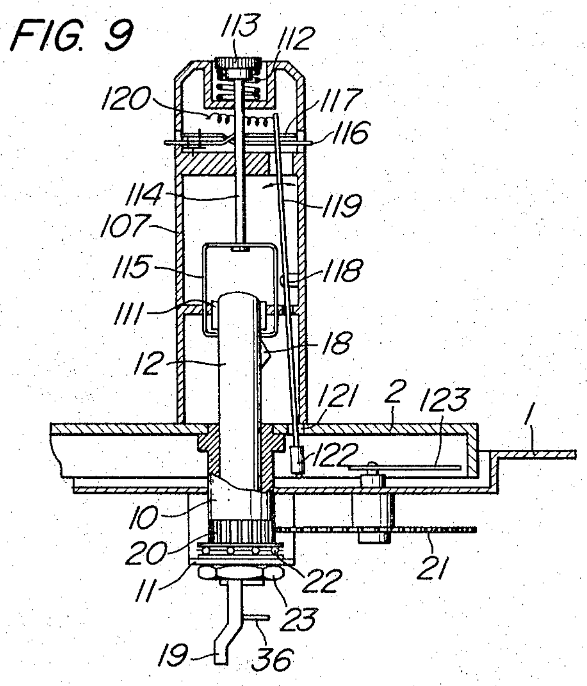
FIG. 9 is a view similar to FIG. 8 illustrating the major parts of the continuous disc dropping device.

FIG. 9 illustrates an arrangement including a device incorporated in the adapter 107 for automatic drop of record discs 24. This device includes a bearing member 111 provided on the adapter to fit in the center shaft 12 for the turntable 2 for the purpose of supporting the adapter 107 on the center shaft 12 in a manner so as to rotate therewith and hence with the turntable. An operating button 113 is arranged on top of the adapter 107 and normally biased upwardly by a spring 112. Downward movement of the operating button 113 when depressed is transmitted to the actuator pawl 18 on the start lever 15 by way of an operating rod 114 and a push piece 115 connected thereto and vertically slidable along the turntable center shaft 12.

Pawl blades 116 and 117 are arranged in the upper portion of the adapter 107 as conventionally used in many of previous automatic disc dropping devices. The pawl blades are associated with each other in superposed relation to be advanced and retracted radially of the adapter 107 to allow the lowest one of the stacked discs to drop while latching the next lowest disc. An actuating lever 119 is pivotally mounted in the adapter 107 by means of a pin 118 for the purpose of actuating the pawl blades into advanced position. As observed, the actuating lever 119 is in engagement at the top end with the pawl blades 116 and 117 and is normally biased in one direction by a spring 120. The actuating lever 119 extends at its bottom through an aperture 121 formed in the turntable 2 and carries a roller 122 therebeneath.

On the other hand, a rotary cam 123 is fixedly mounted on the shaft of the main gear wheel 21 forming a part of the main mechanism for rotation with the wheel 21. The rotary cam 123 acts upon the roller 122 carried on the actuating lever 119 as the tonearm 3 is swung back to its normal position on the tonearm rest 7 when the disc has been played out. This action of the rotary cam 123 causes the actuating lever 119 and hence the pawl blades 116 and 117 to operate so as to allow the lowest disc 24 to drop onto the turntable under gravity.

The automatic sequential operation of the record player of the above-described construction will next be described.

Figure 4:
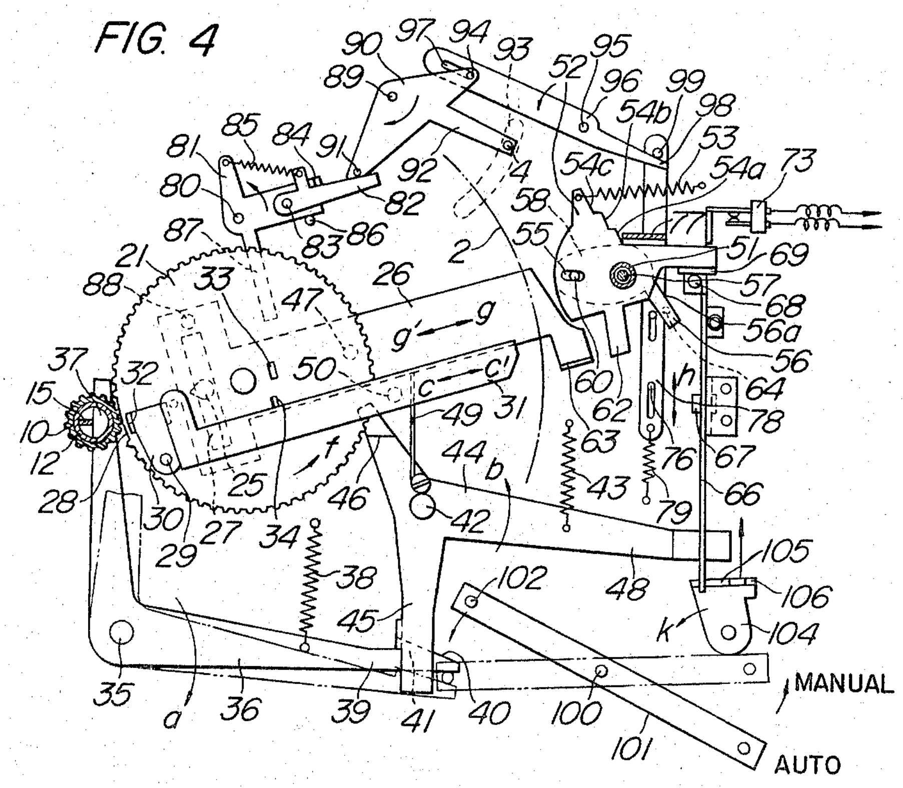
FIG. 4 is a top plan view of the main mechanism shown in FIG. 3.

First, assume that the release lever 101 is shifted to the "AUTO" position indicated in FIG. 4 to disengage pin 102 carried on the lever at its one end from the tapered edge 40 of the bellcrank lever 36 and that the extremity of the cam lever 66 is positioned at the inclined bottom of the upstanding piece 106, as shown in FIG. 6, and the tonearm 3 is placed on the tonearm rest 7. Then, as shown in FIG. 3, a record disc 24 is placed on the turntable 2 with the central aperture in the disc fitted over the center shaft 12 for the turntable.

On this occasion, the internal edge of the central aperture in the disc 24 slides over the tapered portion 16 of the actuator pawl 18 on the start lever 15 arranged in the vertical slit 13 formed in the turntable center shaft 12 to push the actuator pawl 18 into the turntable center shaft so that the start lever 15 is rocked about the pivot 14 in a counterclockwise direction as indicated by the arrow.

In this manner, the bellcrank lever 36 with its one arm 37 previously held in engagement with the bottom portion of the start lever 15 is rotated in the direction indicated by the arrow *a* against the bias of spring 38 so that the hook formation 41 on the bellcrank lever 36 is released from engagement with the first arm 45 of the three-armed lever 44 to allow the latter to rotate under the action of spring 43 in the direction indicated by the arrow *b*. Accordingly, the starting bar 31 is shifted in the direction of the arrow *c* (i.e. toward the center of the turntable 2) under the pressure of resilient piece 49, attached to the three-armed lever 44, and thus causes the starting pawl 30 mounted on the main gear wheel 21 to project into the recess 28 formed therein.

On the other hand, as the three-armed lever 44 is rotated counterclockwise as indicated by the arrow *b* with its third arm 48 shifting in the direction of the arrow *d*, the cam lever 66 is swung in the direction of the arrow *e* in FIG. 5. to release the pin 68 provided on the end of the cam lever 66 from the lug 69, formed on the selector plate 52. As the result, the selector plate 52 is slightly rotated in a clockwise direction under the bias of spring 53 until its shoulder 54*a* is brought into abutment against the projection 77 on the slider 78. Previously open switch 73 is thus closed to energize the motor 72 thereby to drive the turntable 2 and its shaft 10.

Rotation of the turntable shaft 10 causes the gear portion 20 formed thereon to actuate the start pawl 30 projecting into recess 28 in the main gear wheel 21 thereby to slightly drive the latter. Immediately thereafter, the gear portion 20 on the turntable shaft 10 comes into meshing engagement with the teeth of gear wheel 21 to rotate the latter in the direction of the arrow *f* in FIG. 4.

This rotation of the main gear wheel 21 with pin 47 carried thereon causes the first and second levers 81 and 82 to operate to rotate the third lever 90 to rotate as indicated by the arrow until the detector pin 4 mouned on the extension of the third lever 90 comes into engagement with the outer periphery of the record disc 24. In proportion to the amount of rotation of the third lever 90, the fourth lever 96 is rotated by the third one 90.

This rotation of the fourth lever 96 causes the slider 78 to move in the direction of the arrow *h* against the bias of spring 79 through the intermediary of pin 99 carried on the slider 78 until the projection 77 thereon is positioned on one of the shoulders such as 54*b* formed on the selector plate 52 which corresponds to the size of the record disc 24.

On the other hand, slider base 26 is moved axially with rotation of the main gear wheel 21 by means of pin 25 carried thereon. Movement of the slider base 26 in the direction indicated by *g* causes the pusher plate 63 formed thereon to act upon the lug 62 formed on the selector plate 52 so that the latter is rotated until the clutching aperture 55 formed in the planar body of the selector plate 52 is brought into alignment with the clutch pin 60 carried on the clutch plate 56.

Also, with movement of the slider base 26 in the direction *g*, the pickup lifter rod 57, held in sliding engagement with the camming end 61 of the slider base 26 is moved vertically to raise the tonearm 3 apart from the tonearm rest 7. Simultaneously with this, the clutch lifter plate 58 is also raised so that the clutch pin 60 carried thereon is inserted into the clutching aperture 55 formed in the selector plate 52.

When the slider base 26 is next restored in the direction of the arrow *g'*, the pusher plate 63 is disengaged from the lug 62 on the selector plate 52 to allow the latter to rotate in a clockwise direction under the bias of spring 53.

The rotation of selector plate 52 causes rotation of clutch plate 56 together therewith since the clutch pin 60 on the latter is fitted in the clutching aperture 55 in the former. As the result, the tonearm 3 secured to the clutch plate 56 is swung from its position on the pickup arm rest 7 toward the center of the turntable 2 while being held in raised position. In this manner, when the needle on the tonearm 3 is brought to a position over the outermost portion of the groove in the record disc 24, that is, when the shoulder 54*b* on the selector plate 52 is brought into engagement with the projection 77 on the slider 78 to determine the angular position of the tonearm, the lower portion of the cam formation 61 on the slider base 26 is again positioned at the bottom of the pickup lifter rod 57 so that the rod 59 previously held in its raised position descends together with the tonearm 3 for engagement of the tonearm needle with the outermost turn of the disc groove.

On the other hand, the descent of the tonearm lifter rod 57 causes descent of the clutch lifter plate 58 with the result that the clutch pin 60, previously raised into the clutching aperture 55 in the selector plate 52 is lowered under the action of spring 59 to be disengaged from the aperture 55.

Now that the clutch plate 56 and hence of the pickup sharft 51 secured thereto is free to rotate independently of the selector plate 52, the tonearm needle can follow the record groove for sound reproduction.

The detector pin 4 for detecting the diameter of record discs was first brought into engagement with the outer periphery of the record disc 24 by rotation of the first lever 81 associated with the main gear wheel 21, caused by the movement of the slider base 26 in the direction *g*, as described hereinbefore. However, upon return movement of the slider base 26 in the direction *g'*, it has released the first lever 81 allowing it to restore its normal position to disengage the detector pin 4 from the record disc 24.

During one reciprocation of the slider base 26, that is, during one complete revolution of the main gear wheel 21, the starting bar 31 is actuated by the pin 33 on the surface of the main gear wheel 21 by way of the lug 34 in the direction *c'* to be restored to the initial position while the start pawl 30 is also restored to its normal position by return means, not shown, to retract the lug 32 on the pawl 30 radially inwardly from the recess 28 in the main gear wheel 21.

It will be noted, therefore, that during reproduction the recess 28 in the main gear wheel 21 is opposite to the gear portion 20 of the turntable shaft 10 and the main mechanism including the main gear wheel 21, slider base 26 and other associated parts is held stationary.

Upon rotation of the main gear wheel 21, the pin 47 carried thereon acts upon the second arm 46 of the three-armed lever 44 to rotate the latter in a clockwise direction to its normal position. In this manner, the lug formed on the first arm 45 of the three-armed lever slides over the tapered edge 40 of the bellcrank lever 36 into reengagement with the hook formation 41 thereon in preparation for the next record playing.

Having described operations to start record playing, description will next be made on those after the end of the record playing. At the end of the record playing, that is, when the needle or stylus of the tonearm 3 has reached the end of the groove in the record 24, the pin 64 provided on the clutch plate 56, which rotates with the tonearm 3, for returning the latter to its normal position acts upon the rear end of the start lever 31 to displace the latter in the direction *c*. Consequently, the start pawl 30 formed on the main gear wheel 21 is again advanced into the recess 28 therein and subsequently the toothed portion of the main gear wheel 21 is brought into meshing engagement with the gear portion of the turntable shaft 10 again to cause rotation of the gear wheel 21.

Thus, the slider base 26 is shifted in the direction of the arrow *g* so that the tonearm lifter rod 57 is raised with its bottom end sliding over the cam portion 61 of the slider base 26 and thus raises the tonearm 3 to disengage its needle from the record disc 24.

The rise of the tonearm lifter rod 57 causes rise of the clutch lifter plate 58 so that the clutch pin 60 is fitted in the clutching aperture 55 in the selector plate 52.

Upon continued movement of the slider base 26, the pressure plate 63 thereon acts upon the lug 62 on the selector plate 52 to rotate the latter and the clutch plate 56 in a counterclockwise direction. As the result, the pickup 3 now held in its raised position is swung outwardly of the turntable 2 to a position over the pickup arm rest 7. On this occasion, the selector plate is rotated back into the position shown in FIG. 4 to be restrained by the pin 68 carried on the cam lever 66 and the switch 73 is opened.

Next, upon movement of the slider base 26 in the direction *g'*, the bottom end of the tonearm lifter rod 57 comes into engagement with the lower portion of the cam formation 61 on the slider base so that the tonearm 3 connected with the rod 57 is lowered onto the tonearm rest 7.

On this occasion, the tonearm 3 under gravity depresses the switch actuator rod 75 on the tonearm rest 7 to open the contacts of switch 74 to deenergize the motor 72 and the entire mechanism of the automatic record player is brought to stop.

In order to take the record disc 24 away from the center shaft 12 for the turntable, the operator is only required to lift the disc 24 as with the case of common record players. On this occasion, the tapered portion 17 of the actuating pawl 18 on the start lever 15, arranged in the turntable center shaft 12, is slightly engaged by the edge of the central aperture in the record disc 24 raised so that the start lever 15 is raised as the disc is removed. Subsequently, with the start lever 15 raised by way of its tapered portion 17, the actuating pawl 18 is retracted into the slit 13, formed in the turntable center shaft 12; that is, the start lever is rocked about the pivot 14 in a counterclockwise direction as indicated by the arrow in FIG. 3. Since at this time the bent portion 19 of the start lever 15 at its bottom is opposite to one arm 37 of the bellcrank lever 36, any rotation of the start lever 15 in its raised position is not transmitted to the bellcrank lever 36. It will be recognized, therefore, that upon removal of the record disc 24 the main mechanism of the automatic record player is put into operation by no means.

As described above, the nontouch record player according to the present invention has a turntable device which includes a start lever 15 carrying an actuating pawl 18 and mounted in the turntable center shaft 12 for vertical and rocking movement and with this device the sequential record-playing operation is obtainable. At the first, the start lever 15 is rocked by inserting the center shaft 12 into the center aperture in a record disc 24 to operate the main mechanism for driving the tonearm device, which includes main gear wheel 21 associated with the start lever 15 and slider base 26. The resulting movement of the slider base 26 actuates the disc diameter detector thereby to control the amount of inward swing of the tonearm 3 thereby to automatically determine the starting position of the tonearm where its needle is to be dropped onto the disc surface in accordance with the diameter of record discs. Also, when the record has been played out, the entire system operates automatically to restore its normal state ready to start the next playing operation.

As apparent from the foregoing description, the sequential operation for record playing including restoring operation is entirely performed in an automatic fashion according to the present invention simply by the procedure of placing a record disc 24 on the turntable and any complicated intermediate manual operation such as required with previous record-playing systems has been completely eliminated.

Next, assume that the release lever 101 is rotated from the "AUTO" position to the "MANUAL" position. The release lever is then retained in the "MANUAL" position. Under this condition, since the bellcrank lever 36 has been swung in the direction of the arrow *a*, the start lever 15 arranged in the turntable center shaft 12 is rocked counterclockwise and the actuating pawl 18 on the lever is retracted into the turntable center shaft 12.

Returning the release lever 101 from the "MANUAL" to the "AUTO" position causes engagement of the hook formation 41 on the bellcrank lever 36 with the first arm 45 of the three-armed lever 44 and thus the entire system is reset for automatic record playing.

To summarize, the record player of the present invention has an operating lever or auto-play release lever 101 to actuate the bellcrank lever 36 thereby to rock the start lever 15, arranged in the turntable center shaft 12. That is, the main playing mechanism can be rendered operative or inoperative as desired by operating the auto-play release lever 101 to control the function of the start lever 15. With this arrangement, the record player has a practical advantage that it can be conveniently used with nonstandardized record discs such as film records in quite the same manner as conventional hand-operating record players. Moreover, with the record player set for manual operation, since the actuating pawl 18 of the start lever 15 is in retracted position in the turntable center shaft 12, there is no danger that sheet-like record discs such as film records be damaged by the actuating pawl 18 when they are fitted over the turntable center shaft 12 or removed therefrom.

In addition, the auto-play releasing device, including a minimized number of parts such as release lever 101, does not complicate the player mechanism to any extent.

Description will next be made on the operation of the inventive record player for repeated automatic playing.

Referring to FIG. 5, knob 103 is turned to rotate the cam arm 104 for repeated play in the direction of the arrow *k* in FIG. 4 and hence the cam lever 66 in the direction of the arrow *e* to lower the pin 68 carried on the latter. As long as the levers are held in such rotated position, the lug 69 on the selector plate 52 never comes into engagement with the pin on the cam lever 66 even when the tonearm 3 is swung over the tonearm rest 7 by the pusher plate 63 carried on the slider base 26.

Accordingly, when the slider base 26 is subsequently shifted in the direction *g'*, the clutch pin 60 on the clutch plate 56 is brought into fitting engagement with the clutching aperture 55 in the selector plate 52 and the latter is again rotated in a clockwise direction together with the clutch plate 56 under the bias of spring 53 again to position the stylus of the tonearm 3 over the outermost turn of the groove in the record disc 24. Subsequently, upon further movement of the slider base 26 in the direction *g'*, the tonearm stylus is lowered onto the disc 24 to start playing.

It will be appreciated, therefore, that the record playing is repeated any desired number of times unless the cam lever 66 is rotated so as to engage pin 68 thereon with the lug 69 on the selector plate 52 thereby to restrain rotation of the latter.

Figure 8:
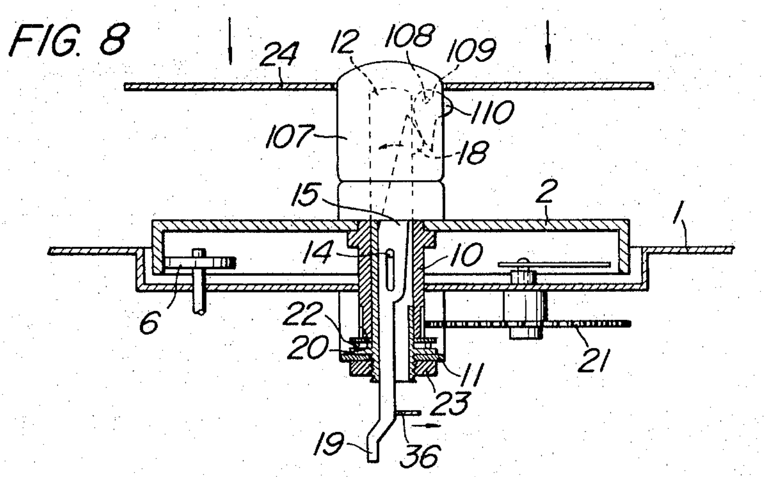
FIG. 8 is a cross-sectional elevation of the disc adapter device.

With the inventive record player, adapter 107 is employed for playing record discs having a larger center bore, as shown in FIG. 8. When the center bore of such record disc 24 is fitted over the adapter 107, the actuator pawl 110 on the actuating lever 109 normally extending beyond the adapter 107 is depressed by the edge of the center bore of the record disc 24 to rock the actuating lever 109 and hence the start lever 15 arranged in the turntable center shaft for cooperation with the actuating lever 109. In this manner, the same automatic playing operation is started as described hereinbefore.

Next, the construction and operation of the automatic disc dropping device used with the adapter 107 will be described in further detail with reference to FIG. 9. As in most of conventional automatic disc dropping devices, the pawl blades 116 and 117 mounted in the adapter 107 are arranged to move in directions opposite to each other; that is, when one of the pawl blades is advanced radially outwardly the other pawl blade is retracted and vice versa so as to allow a stack of record discs to drop on the turntable one after another. The disc releasing movement of the pawl blades is effected when the actuating lever 119 is acted upon by the rotary cam 123 incorporated in the rotative system of the main mechanism. With this form of record player, the automatic playing operation is obtainable by depressing the manual starting button 113, arranged on top of the adapter, to operate the start lever 15 arranged in the turntable center shaft 12 by way of the operating rod 114 and pusher piece 115, as described hereinbefore.

It will be appreciated from the foregoing that the record player of the present invention including adapter 107 can be used with any record discs for their automatic playing irrespective of the diameter of their center bore. In playing these recordings, the start lever 15 arranged in the turntable center shaft is operated by placing the record disc on the turntable automatically to detect the disc diameter and start the main playing mechanism. Thus, the player can operate automatically to play a desired number of discs in succession without necessitating any manual operation at the start of playing operation and thus forms an automatic record player based upon an entirely novel conception. The inventive record player has further advantages including extreme simplicity to handle and comparatively simple mechanism and operation and thus apparently forms a great contribution to the industry.

What is claimed is:

1. In an automatic record player including a frame, a center shaft mounted on said frame, and a turntable rotatably supported on said shaft; the improvement comprising detecting means for detecting the outer diameter of the record, a tonearm pivotally mounted with respect to said frame and having pickup means at one end thereof; a start lever arranged within said center shaft for vertical and rocking movement with respect thereto in response to records being placed on said shaft, transmission means engaging said start lever and adapted to move in response to said start lever movement, drive means responsive to movement of said transmission means for driving said turntable, and means responsive to movement of said transmission means for swinging said tonearm into an angular position corresponding to the detected record diameter for automatic playing, and back into a rest position at the end of the automatic playing.

2. The automatic record player of claim 1, further comprising an actuator pawl carried at the top of said start lever and being operable to displace said start lever upwardly when a record is removed from said center shaft after having been played, said start lever having a bent formation at its bottom for creeping cooperation with said transmission means so that the upward displacement of said start lever will not affect said transmission means.

3. The automatic record player of claim 1, further comprising an autoplay releasing device having an operation mode selection lever rotatable to swing said transmission means to rock and render inoperative said start lever for manual operation.

4. The automatic record player of claim 1, wherein said means for swinging said tonearm comprises a selector plate pivotally mounted in said frame; vertical shaft means rotatably mounted in said frame, extending through said plate, and having said tonearm fixed to one end thereof; clutch means adapted to couple said selector plate to said shaft; a starter base responsive to movement of said transmission means and having at least two camming surfaces, one of said camming surfaces adapted to engage said shaft means to effect vertical movement of said tonearm, and the other of said camming surfaces adapted to engage said selector plate to effect horizontal movement of said tonearm; a cam lever pivotally mounted on said frame and adapted to move in response to movement of said transmission means to releasably engage a lug on said selector plate to block movement of same; whereby, when the record player is started, said cam lever releases said engagement with said lug to allow the tonearm to swing inwardly, said cam lever being brought into engagement with said lug when the tonearm is returned to its rest position to restrain the inward swing of the tonearm; and means to disengage said cam lever from said selector plate for repeated automatic playing.

5. The automatic record player of claim 1, further comprising an adapter to be detachably fitted over said center shaft to fittingly receive a record having a center bore of a larger diameter than that of said center shaft, said adapter including an actuating lever operatively engaged with said start lever within said adapter, and an outwardly projecting pawl adapted to be engaged by said record.

6. The automatic record player of claim 1, further comprising an adapter to be detachably fitted over said center shaft to fittingly receive a record having a center bore of a larger diameter than said shaft, and an automatic disc dropping device attached to said adapter and including a plurality of pawl blades operable in response to rotation of said turntable, said adapter including an operating button operably connected with said start lever.

References Cited

UNITED STATES PATENTS

| | | | |
|---|---|---|---|
| 2,621,047 | 12/1952 | Carreau | 274—39 X |
| 2,632,650 | 3/1953 | Offutt | 274—10 X |

LEONARD FORMAN, *Primary Examiner.*

HARRY N. HAROIAN, *Assistant Examiner.*